US009836867B2

(12) United States Patent
Bostick et al.

(10) Patent No.: US 9,836,867 B2
(45) Date of Patent: Dec. 5, 2017

(54) PHOTOGRAPH AUGMENTATION WITH GARMENT OVERLAY

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/934,724

(22) Filed: Nov. 6, 2015

(65) Prior Publication Data
US 2017/0132818 A1    May 11, 2017

(51) Int. Cl.
*G09G 5/00* (2006.01)
*G06T 11/60* (2006.01)

(52) U.S. Cl.
CPC .......... *G06T 11/60* (2013.01); *G06T 2210/16* (2013.01)

(58) Field of Classification Search
CPC ......... G06T 19/00; G06T 19/006; G06T 7/00; G06T 7/0024; G06T 7/0032; G06T 7/004; G06T 7/0044; G06T 11/60
USPC ............... 345/619, 629, 630, 632, 633, 634
See application file for complete search history.

(56) References Cited

U.S. PATENT DOCUMENTS

| | | | |
|---|---|---|---|
| 6,144,388 A | 11/2000 | Bornstein | |
| 8,379,920 B2 | 2/2013 | Yang | |
| 8,674,989 B1 | 3/2014 | Dalal | |
| 2001/0042029 A1 | 11/2001 | Galvez | |
| 2002/0045959 A1* | 4/2002 | Van Overveld | G06Q 30/02 700/90 |

(Continued)

FOREIGN PATENT DOCUMENTS

CN      103440587 A  * 12/2013

OTHER PUBLICATIONS

Liu, Zhijiao, Jesus Suarez, You Wu, and Feiyu Yu. "GetDressed: A Personalized and Contextually-Aware Clothing Advisor for the Home" (2014) pp. 1-11.*

(Continued)

*Primary Examiner* — Xiao Wu
*Assistant Examiner* — Sarah Lhymn
(74) *Attorney, Agent, or Firm* — William H. Hartwell; Andrew D. Wright; Roberts Mlotkowski Safran Cole & Calderon, P.C.

(57) ABSTRACT

Systems and methods for rendering an image of a selected garment on a photograph containing a selected individual are disclosed. A computer-implemented method includes: analyzing and tagging, by a computing device, a plurality of photographs stored in a repository; receiving, by the computing device, an indication of a selected garment and a selected individual; determining, by the computing device, a selected photograph from the plurality of photographs based on at least one of: appropriateness of outfit; appropriateness of environment; and usage patterns; generating, by the computing device, an augmented photograph by superimposing an image of the selected garment on the selected photograph; and transmitting, by the computing device, the augmented photograph to a client device.

20 Claims, 6 Drawing Sheets

(56) References Cited

U.S. PATENT DOCUMENTS

| | | | |
|---|---|---|---|
| 2003/0076318 A1 | 4/2003 | Shaw-Weeks | |
| 2006/0253491 A1* | 11/2006 | Gokturk | G06F 17/30256 |
| 2007/0294142 A1 | 12/2007 | Kattner | |
| 2009/0089186 A1 | 4/2009 | Paolini | |
| 2010/0191578 A1 | 7/2010 | Tran | |
| 2012/0022978 A1 | 1/2012 | Manea | |
| 2013/0156275 A1* | 6/2013 | Amacker | G06K 9/00677 |
| | | | 382/118 |
| 2014/0040041 A1 | 2/2014 | Ohnemus | |
| 2014/0201028 A1 | 7/2014 | Bhardwaj | |
| 2014/0211065 A1* | 7/2014 | Sudheendra | H04N 5/23293 |
| | | | 348/333.02 |
| 2015/0302505 A1* | 10/2015 | Di | G06K 9/00362 |
| | | | 705/26.7 |
| 2016/0026926 A1* | 1/2016 | Yeung | G06Q 30/0269 |
| | | | 706/12 |
| 2016/0267576 A1* | 9/2016 | Crossman Sullivan | G06Q 30/0601 |

OTHER PUBLICATIONS

Fisher, "The Fashion Apps to Download Now—Best Fashion Apps for Your Phone", http://www.harpersbazaar.com/fashion/trends/a2713/best-fashion-apps/, Jun. 11, 2015. 9 pages.

Anonymous, "Magic Mirror—Miss Selfridge", http://www.miss-selfridge.com/en/msuk/category/magic-mirror-298858/home?geoip=noredirect, Accessed Jul. 16, 2015. 2 pages.

Mell et al., "The NIST Definition of Cloud Computing", NIST, Special Publication 800-145, Sep. 2011, 7 pages.

\* cited by examiner

PHOTOGRAPH AUGMENTATION WITH GARMENT OVERLAY

BACKGROUND

The present invention relates generally to rendering an image of a garment on a digital photograph of a person and, more particularly, to methods and systems for selecting a digital photograph for garment overlay based on analytics.

Increasingly more shoppers are buying items of clothing online rather than in physical stores. However around 40% of clothing bought online is later returned—far higher than the rate of return at physical stores. Part of the problem of online shopping for clothing is the purchaser cannot try on the item for fit. But the problem persists when buying items of clothing for other people. This can be partially attributed to the difficulty in visualizing an item of clothing on a person without seeing that item of clothing on a person. And while visualizing single items is hard, visualizing how whole outfits will look is even harder.

SUMMARY

In an aspect of the invention, a computer-implemented method includes: analyzing and tagging, by a computing device, a plurality of photographs stored in a repository; receiving, by the computing device, an indication of a selected garment and a selected individual; determining, by the computing device, a selected photograph from the plurality of photographs based on at least one of: appropriateness of outfit; appropriateness of environment; and usage patterns; generating, by the computing device, an augmented photograph by superimposing an image of the selected garment on the selected photograph; and transmitting, by the computing device, the augmented photograph to a client device.

In another aspect of the invention, there is a computer program product for rendering an image of a selected garment on a photograph containing a selected individual. The computer program product includes a computer readable storage medium having program instructions embodied therewith. The program instructions are executable by a computing device to cause the computing device to: analyze and tag a plurality of photographs stored in a repository; receive an indication of the selected garment and the selected individual; determine a selected photograph from the plurality of photographs based on at least one of: appropriateness of the selected garment to other garments in the plurality of photographs; appropriateness of the selected garment to environments in the plurality of photographs, and determined usage patterns of the selected individual in the plurality of photographs; generate an augmented photograph by superimposing the image of the selected garment on the selected photograph; and transmit the augmented photograph over a network to a client device.

In another aspect of the invention, there is a system for rendering an image of a selected garment on a photograph containing a selected individual. The system includes a CPU, a computer readable memory and a computer readable storage medium associated with a computing device. The system includes: program instructions to analyze and tag a plurality of photographs stored in a repository using facial recognition, garment recognition, and environment recognition; program instructions to receive an indication of the selected garment and the selected individual; program instructions to determine a selected photograph from the plurality of photographs based on: appropriateness of the selected garment to other garments in the plurality of photographs; appropriateness of the selected garment to environments in the plurality of photographs, and determined usage patterns of the selected individual in the plurality of photographs; program instructions to generate an augmented photograph by superimposing the image of the selected garment on the selected photograph; and program instructions to transmit the augmented photograph over a network to a client device. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to rendering an image of a garment on a digital photograph of a person and, more particularly, to methods and systems for selecting a digital photograph for garment overlay based on analytics. According to aspects of the invention, images of items of clothing (e.g., garments) are rendered onto a digital photograph of a person so that the person in the photograph appears to be wearing the garments. In embodiments, a system analyzes the garments and selects an appropriate photograph based upon the person and garment appearance, appropriate environment, and personalized usage patterns. This ensures the garments are rendered on a person in way that most resembles how the garment is likely to be worn in real life. Implementations of the invention utilize a repository of digital photographs, visual analysis, and usage patterns to provide an improved online shopping experience that is tailored specifically to the person for which the garments are being purchased.

In aspects of the invention, there is a method and system by which a user can display one or more garments on a person (e.g., an individual), whereby the garments are augmented onto an existing photograph of the person. Garments can include, for example, articles of clothing and accessories such as sunglasses and hats. The photograph for augmentation is selected based upon a series of criteria including at least one of: the prominent appearance of the person and garment(s) to augment in the photograph; the appropriateness of an outfit (e.g., so a t-shirt is not shown with ski pants) and to avoid creating an outfit where the augmented items do not match with the other items worn (e.g., vertical striped shirt does not match horizontal striped pants); the appropriateness to an environment (e.g., a ski jacket would not be worn on a beach on a summer's day); and situations matching the historical preferences of the person (e.g., the person only wears long sleeve shirts in the winter, so a picture taken in winter should be used). In embodiments, the candidate photographs from which a photograph for augmentation is selected are stored in a repository defined by the user.

According to aspects of the invention, an analysis system utilizes analysis of digital photographs in a photograph repository, selects an appropriate photograph of a person on which to augment one or more garment images, and renders the garment images onto the selected photograph. In embodiments, the analysis is based on at least one of: a person's appearance and garment position in a picture; appropriateness of the newly created outfit to the person; and appropriateness of the newly created outfit in the environment where the photograph is taken. In this manner, implementations of the invention select a photograph that represents situations where a person would typically wear the new garment. Solutions achieved by aspects of the invention provide advantages over online shopping experiences which show items of clothing on a model or by themselves, or make use of an avatar. The experience achieved by aspects of the invention may also be superior to shopping for clothing in a physical store, as aspects of the invention allows a purchaser to view how the item of clothing will be most likely used in real life.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
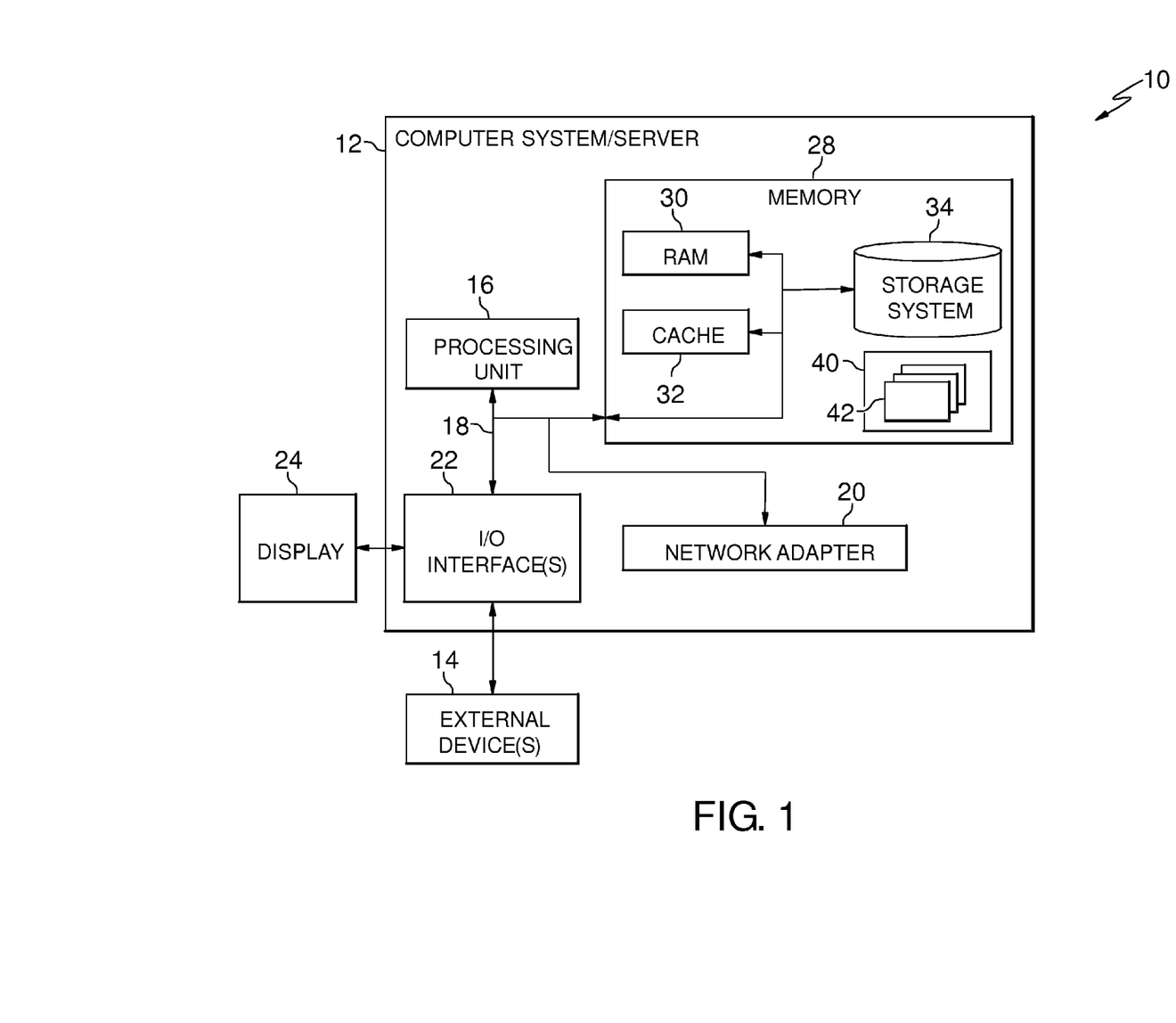
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
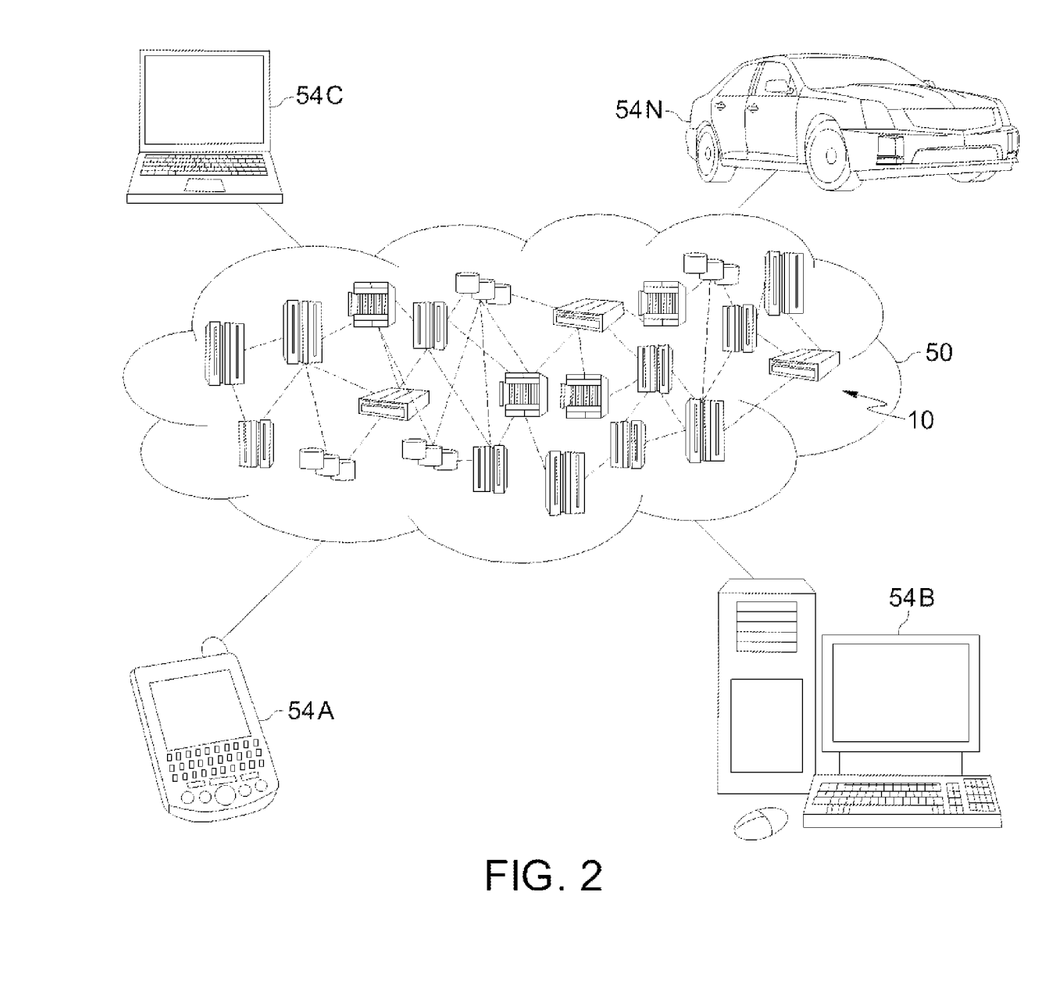
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
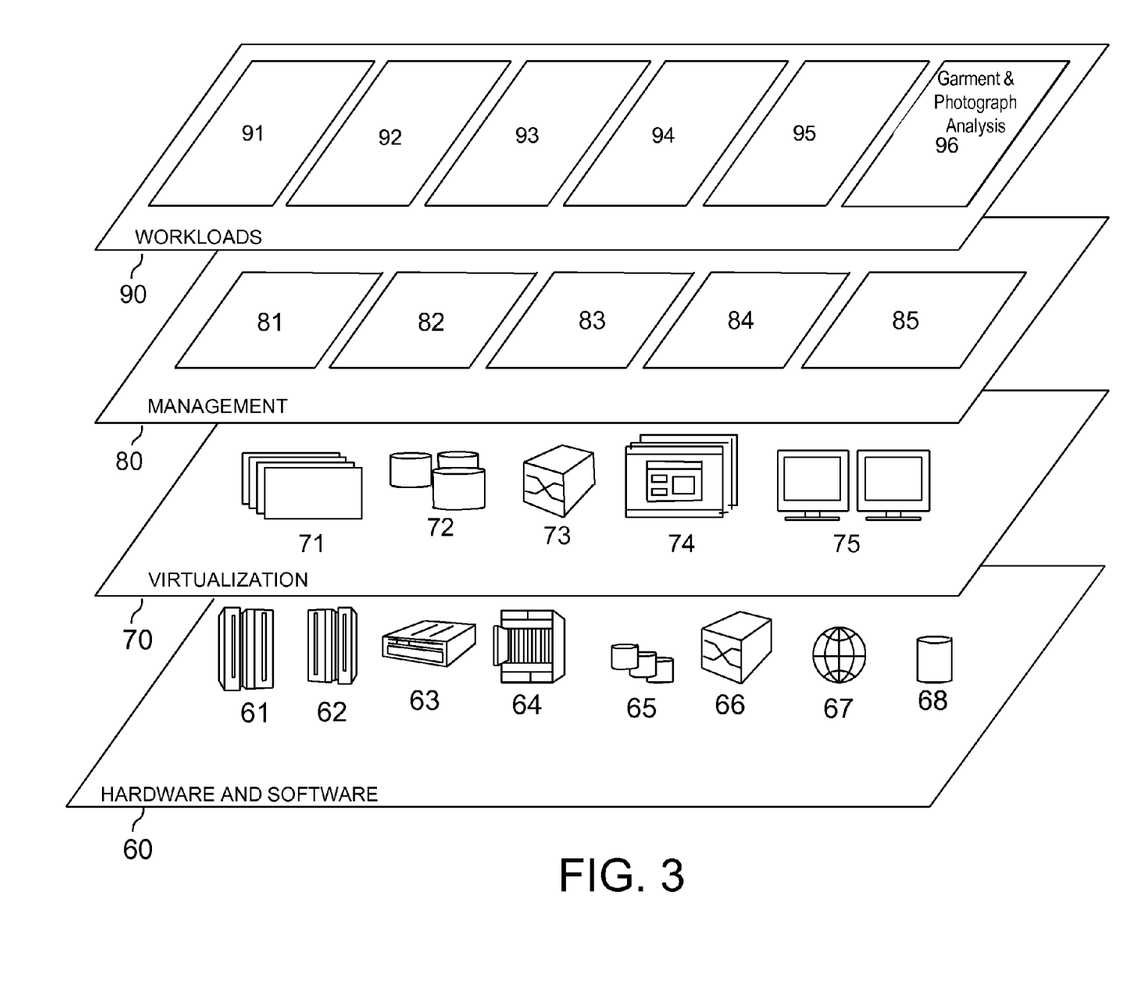
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and garment and photograph analysis 96.

Figure 4:
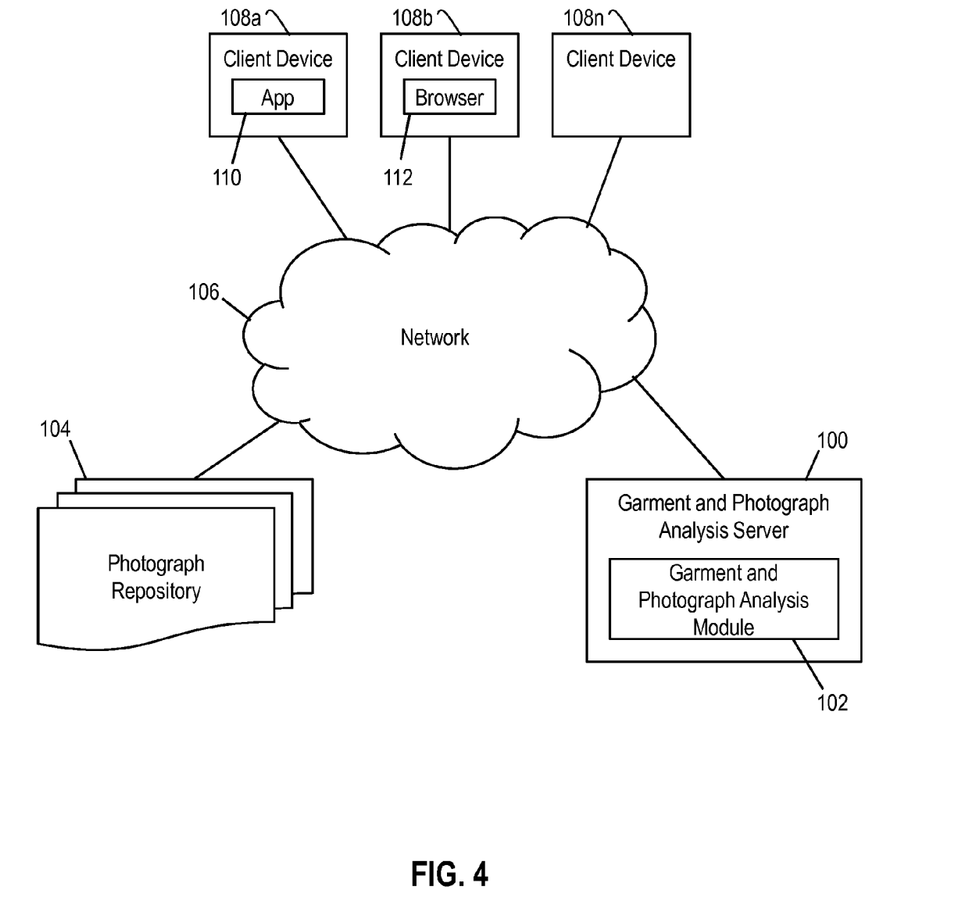
FIG. 4 shows a computing environment in accordance with aspects of the invention.

FIG. 4 shows a computing environment in accordance with aspects of the invention. In embodiments, the environment comprises a garment and photograph analysis server 100 (referred to herein as an analysis server) running a garment and photograph analysis module 102 (referred to herein as an analysis module). The analysis server 100 may be the computer system/server 12 of FIG. 1, and the analysis module 102 may be one of the program modules 42 running on the computer system/server 12.

Still referring to FIG. 4, in aspects the computing environment also includes a photograph repository 104 that stores digital photographs of one or more users. The analysis server 100 and repository 104 may be connected to a network 106, which may be any suitable communications network such as a LAN, WAN, or the Internet. In a preferred embodiment, the analysis server 100 and repository 104 are nodes in a networked computing environment, e.g., such as nodes 10 in cloud computing environment 50 shown in FIG. 2.

With continued reference to FIG. 4, any number of client devices 108a, 108b, . . . , 108n may be connected to the network 106 to access the analysis server 100 and repository 104. The client devices 108a-n may be user computer devices such as smartphones, tablet computers, laptop computers, desktop computers, etc. Each one of the client devices 108a-n may include a client program, such as an app 110 (e.g., a desktop or mobile application) and/or a browser 112, for interfacing with the analysis server 100 and/or the repository 104.

Figure 5:
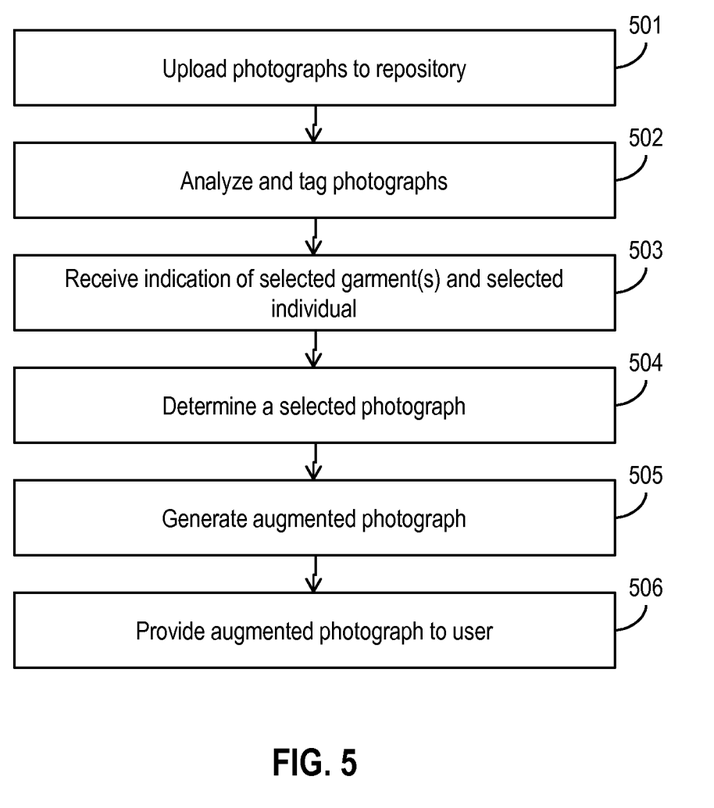
FIG. 5 shows a flowchart of a method in accordance with aspects of the invention.

FIG. 5 shows a flowchart of a method in accordance with aspects of the invention. Steps of the method of FIG. 5 may be performed by devices in the environment illustrated in FIG. 4.

At step 501, photographs are uploaded to the repository 104 and identified to the analysis server 100. According to aspects of the invention, a user of a client device (e.g., 108a) uses the client device 108a to upload digital photographs to the repository 104 where the digital photographs are stored in computer storage. For example, the user may have an account at the repository 104 that is used to associate certain stored photographs with the user. In embodiments, the client device 108a also identifies the repository 104 to the analysis server 100, e.g., by providing the user's repository account information, such as user name and password, to the analysis server 100.

At step 502, photographs in the repository 104 are analyzed and tagged. In accordance with aspects of the invention, the analysis module 102 accesses the user's account at the repository 104, e.g., using the user's repository account information, and analyzes and tags each photograph associated with the user's account in the repository 104. In embodiments, the analysis module 102 analyzes the user's photographs in the repository 104 using facial recognition, garment recognition, and environment recognition techniques. The analysis module 102 generates tags for each of the user's photographs in the repository 104 based on the analysis, and stores the tags in the analysis server 100, e.g., in memory such as storage system 34 as shown in FIG. 1.

For example, using one or more facial recognition algorithms, the analysis module 102 analyzes the user's photographs in the repository 104 and tags each photograph with identities (e.g., names) of individuals that are recognized by the facial recognition. In this manner, the analysis module 102 determines which individuals are shown in each photograph and stores a record of this determination (e.g., as tags).

Additionally, using one or more garment recognition algorithms, the analysis module 102 analyzes the user's photographs in the repository 104 and tags each photograph with identified types of garments. In embodiments, using garment recognition algorithms, the analysis module 102 may determine that one or more of a plurality of predefined types of garments is present in each photograph. In this manner, the garment(s) worn by each individual in a given photograph are analyzed using image analysis and tagged. For example, the system may determine via image analysis of a particular photograph that an individual in the photograph is wearing a t-shirt that is green in color and has short sleeves, and that the individual is also wearing pants that are blue in color and sneakers that are white in color. Any number of types of garments may be defined for analysis and tagging by the analysis module 102. For example, and without limitation, the analysis module 102 may be programmed to analyze and tag garments in the user photographs according to the following types: garment type (e.g., shirt, pants, swimwear, hat, footwear, sunglasses, bag, etc.), garment color, garment pattern (e.g., solid, stripes, etc.), shirt sleeve length (e.g., short, long, N/A), pants leg length (e.g., short, long, N/A), footwear type (e.g., sneakers, dress shoes, high heels, N/A), hat type (e.g., ball cap, fedora, N/A). The aforementioned types of tags are merely exemplary, and any desired number and types of tags may be defined for use in the garment recognition algorithms.

Additionally, using one or more environment recognition algorithms, the analysis module 102 analyzes the user's photographs in the repository 104 and tags each photograph with identified types of environment. In this manner, the environment associated with an individual in a photograph may be recorded using a combination of image analysis and geolocation information stored in the photograph exchangeable image file format (EXIF) metadata. For example, based on geolocation metadata of a photograph and/or image analysis of the photograph, the analysis module 102 may determine that one of a plurality of predefined types of environments is present in each photograph. Any number and types of environments may be used, including without limitation: beach, snow cover, urban, rural, sporting event, sunny, raining, snowing.

In embodiments, the analysis and tagging is performed automatically by the analysis module 102 based on programmed algorithms and rules. However, the system may be configured to permit a user to manually tag the photographs. For example, after the tagging by the analysis module 102, the user may employ the client program (e.g., app 110 or browser 112) to access an interface, e.g., a graphic user interface (GUI), that permits the user to augment the tags that are defined by the analysis module 102. For example, via the GUI, the user may view a selected photograph and the tag(s) applied to the photograph by the analysis module 102, and the user may add more tags and/or change values of assigned tags. For example, the user may provide input that associates respective names (e.g., usernames) with respective tagged individuals. In this manner, user input may be utilized by the system to enhance the accuracy of the tagging.

At step 503, at least one garment and an individual are selected. In accordance with aspects of the invention, a user utilizes the client device (e.g., 108a) to select which garment or garments they wish to see worn by a particular individual in one of the user's photographs. In embodiments, the client program (e.g., app 110 or browser 112) includes an interface that displays garments to the user and permits the user to select a garment for rending over a photograph. The interface may include, for example, an online shopping interface provided by a department store or other garment retailer. When the user selects a garment and an individual via the interface, the client program passes a digital representation of the selected garment and a name (e.g., username) of the selected individual to the analysis server 100 using an application program interface (API) of the analysis server 100.

In embodiments, each of the selectable garments is provided with tags that correspond to tags associated with the user's photographs in the repository 104. For example, each of the garments that the user may view and select on the online shopping interface may be tagged with tags that define: garment type (e.g., shirt, pants, swimwear, hat, footwear, sunglasses, bag, etc.), garment color, garment pattern (e.g., solid, stripes, etc.), shirt sleeve length (e.g., short, long, N/A), pants leg length (e.g., short, long, N/A), footwear type (e.g., sneakers, dress shoes, high heels, N/A), hat type (e.g., ball cap, fedora, N/A).

At step 504, the analysis module 102 selects a photograph from the repository for displaying with the specified garment from step 503. In accordance with aspects of the invention, the system analyzes the tags from step 502 to determine a best photograph on which the render an image of the selected garment from step 503. In embodiments, analysis module 102 may analyze each of the user's photographs in the repository 104 based criteria including on at least one of: whether the selected individual is in a photograph; garment position in the photograph; appropriateness of the selected garment with other clothing worn by the selected individual in the photograph; appropriateness of the selected garment with the environment included in the photograph; and usage patterns of the selected individual in plural photographs. Based on the analysis using one or more of these criteria, the analysis module 102 selects an optimum (e.g., best-fit) photograph to be augmented with the image of the selected garment.

In an exemplary implementation, the analysis at step 504 includes determining a respective score for each criterion for each of the user's photographs in the repository. A cumulative score for each photograph is then determined as the sum of the respective criteria scores for the photograph. The photograph with the highest cumulative score may be used as the selected photograph.

The analysis at step 504 may include determining whether the selected individual is in each particular photograph. In embodiments, the analysis module 102 compares the name (e.g., username) of the selected individual from step 503 to names (e.g., usernames) of individuals defined in the tags from step 502. Based on this comparison, the analysis module 102 may determine a subset of the user's photographs in the repository 104 that contain the selected individual.

The analysis at step 504 may also be based on garment position in each photograph. In embodiments, the analysis module 102 compares tags associated with the selected garment to tags associated with a particular photograph to determine whether the selected garment is the same type of garment as contained in the picture. For example, the selected garment might be tagged as a shirt with short sleeves, and the analysis module 102 would use the tags to identify photographs that include the selected user wearing a shirt with short sleeves. This criterion may also include determining a relative measure of how clearly the selected garment will appear when worn by the individual in the photograph.

The analysis at step 504 may also be based on appropriateness of the selected garment with other clothing worn by the selected individual in the photograph. In embodiments, the analysis module 102 compares tags associated with the selected garment to tags associated with a particular photograph, and employs pre-defined rules that define matching types of garments and non-matching types of garment to determine appropriateness of the selected garment for the individual in the photograph. This criterion is used to determine whether the selected garment appropriately matches other clothing worn by the individual in the photograph. For example, the selected garment might be a shirt with vertical stripes (as defined by tags), the individual in the photograph might be wearing pants with horizontal stripes (as defined by tags), and the analysis module 102 may be programmed with a rule indicating that combining horizontal stripes with vertical stripes is a mis-match, which would result in a low score for this photograph for this criterion. As another example, the selected garment might be a brown belt (as defined by tags), the individual in the photograph might be wearing brown pants (as defined by tags), and the analysis module 102 may be programmed with a rule indicating that belt color being the same as pants color is a match, which would result in a high score for this photograph for this criterion. Any number and type of rules may be predefined and used in determining the appropriateness of the selected garment with other clothing worn by the selected individual in the photograph.

The analysis at step 504 may also be based on appropriateness of the selected garment with the environment included in the photograph. In embodiments, the analysis module 102 compares tags associated with the selected garment to tags associated with a particular photograph, and employs pre-defined rules that define matching types of garments and environments. This criterion is used to determine whether the selected garment will look appropriate in the environment of the photograph. For example, the selected garment might be a t-shirt with short sleeves and a pair of high heel shoes (as defined by tags), the environment in the photograph might be an athletic venue such as a tennis court (as defined by tags), and the analysis module 102 may be programmed with a rule indicating that high heel shoes are not appropriate for athletic venues, which would result in a low score for this photograph for this criterion. As another example, the selected garment might be a swim suit (as defined by tags), the environment in the photograph might be an ocean beach (as defined by tags), and the analysis module 102 may be programmed with a rule indicating that swim suits are appropriate for an ocean beach, which would result in a high score for this photograph for this criterion. Any number and type of rules may be predefined and used in determining the appropriateness of the selected garment with the environment in the photograph.

The analysis at step 504 may also be based on usage patterns of the selected individual in plural photographs. In embodiments, the analysis module 102 uses the tags and one or more analytics algorithms to determine usage patterns of the selected individual in the user's photographs in the repository 104. For example, the analysis module 102 may utilize cluster analytics (e.g., clustering) with the tags to determine usage patterns, such as the individual favors wearing a particular type of tagged garment (e.g., a baseball hat) at a particular type of tagged environment (e.g., the beach). In this example, when the selected garment is a baseball hat, photographs that are tagged as a beach environment will be given a relatively higher score for this criterion than photographs that are not tagged as the beach. Aspects of the invention are not limited to this example, and any type of analytics may be used to determine usage patterns of the selected individual in the photographs.

After determining the selected photograph at step 504, the process proceeds to step 505 where the selected garment is rendered on the selected photograph to generate an augmented photograph. In embodiments, the analysis server 100 accesses the repository 104 and retrieves a copy of the selected photograph. The analysis server 100 augments the selected photograph by rendering the image of the selected garment on the selected photograph (e.g., by superimposing), such that it appears that the selected individual in the selected photograph is wearing the selected garment. Conventional techniques may be used to render the image of the selected garment on the selected photograph.

At step 506, the augmented photograph is provided to the user. In embodiments, the analysis server 100 transmits the augmented photograph to the client device 108a via the network 106, and the client program causes the augmented photograph to be visually displayed on a display system of the client device 108a. In this manner, the user is provided with a visual display of the augmented photograph of the selected user wearing the selected garment.

Figure 6:
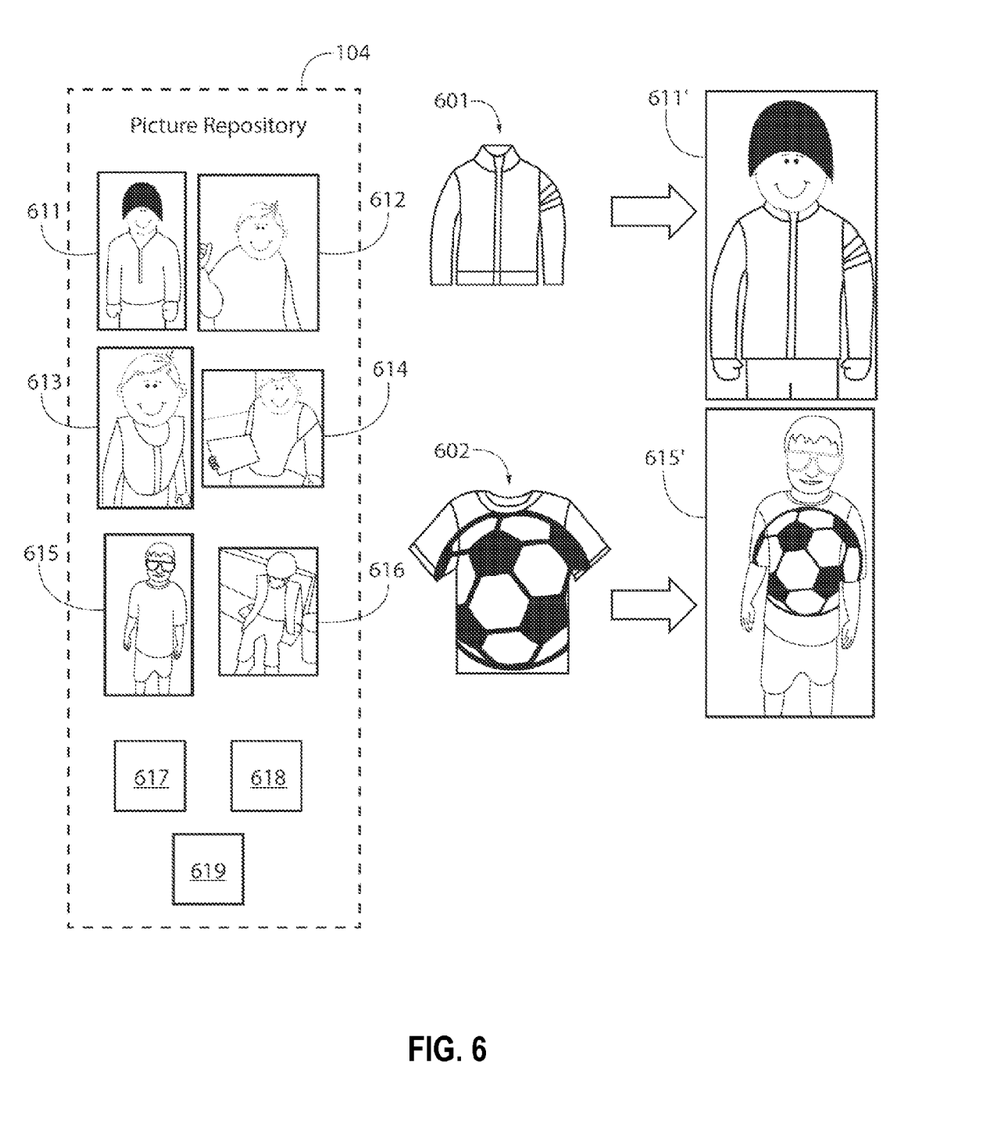
FIG. 6 shows an exemplary use case involving aspects of the invention.

FIG. 6 shows an exemplary use case involving aspects of the invention. In the example depicted in FIG. 6, a user is using their client device (e.g., 108a) to run a client program (e.g., a shopping app or browser-based program) of a garment retailer. In the client program, and in a manner similar to step 503, the user has selected garment 601 (e.g., a coat) and garment 602 (e.g., a shirt with short sleeves and a pattern), and indicated the selected individual with the username Person1. The analysis module 102 accesses the repository 104 and determines that there are six photographs 611-616 in the user's account that are tagged with the selected individual (Person1). The repository may include other photographs 617-619 in the user's account that are not tagged with the selected individual (Person1).

Continuing the example of FIG. 6, the analysis module uses the tags associated with the six photographs 611-616 and the tags associated with garment 601 to determine that photograph 611 is the best match for garment 601, e.g., in the manner described with respect to step 504. Based on this determination, the analysis server 100 generates an augmented photograph 611' with an image of garment 601 superimposed over the selected individual (e.g., step 505), and transmits the augmented photograph 611' to the client device (e.g., 108a) for display on the client device (e.g., step 506).

Still referring to FIG. 6, in this example, the analysis module uses the tags associated with the six photographs 611-616 and the tags associated with garment 602 to determine that photograph 615 is the best match for garment 602, e.g., in the manner described with respect to step 504. Based on this determination, the analysis server 100 generates an augmented photograph 615' with an image of garment 602 superimposed over the selected individual, and transmits the augmented photograph 615' to the client device (e.g., 108a) for display on the client device.

In still additional embodiments, the invention provides a computer-implemented method for providing an augmented photograph of a selected user wearing a selected garment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
analyzing and tagging, by a computing device, a plurality of photographs stored in a repository,
wherein the analyzing includes determining identified types of environment in each of the plurality of photographs based on a combination of an image analysis of each the plurality of photographs and geolocation metadata of each the plurality of photographs, and
wherein the tagging includes: tagging each of the plurality of photographs with identities of individuals in the plurality of photographs, tagging each of the plurality of photographs with identified types of garments in the plurality of photographs, and tagging each of the plurality of photographs with the identified types of environment in the plurality of photographs;
receiving, by the computer device, an augment to the tagging of each of the plurality of photographs via a graphical user interface;
receiving, by the computing device, an indication of a selected garment and a selected individual, wherein the analyzing includes determining a photograph from the plurality of photographs on which to render an image of the selected garment based on: the selected individual being in the photograph, a garment position in the photograph, appropriateness of the selected garment with other clothing worn by the selected individual in the photograph;

determining, by the computing device, the selected photograph from the plurality of photographs based on a score of the appropriateness of outfit, appropriateness of environment, and usage patterns for each of the plurality of photographs;

generating, by the computing device, an augmented photograph by superimposing an image of the selected garment on the selected photograph; and transmitting, by the computing device, the augmented photograph to a client device.

2. The method of claim 1, wherein the analyzing comprises facial recognition, garment recognition, and environment recognition.

3. The method of claim 1, further comprising:
determining a cumulative score for each of the plurality of photographs based on a sum of the score of the appropriateness of outfit, appropriateness of environment, and usage patterns for each of the plurality of photographs; and
determining a subset of the plurality of photographs that include the selected individual.

4. The method of claim 3, wherein the selected photograph is determined from the subset of the plurality of photographs, and
wherein determining the subset of the plurality of photographs is based on comparing a name of the selected individual with identities of individuals defined in the tagging.

5. The method of claim 4, wherein the superimposing the image of the selected garment on the selected photograph comprises superimposing the image of the selected garment over an image of the selected individual in the selected photograph such that the selected individual in the selected photograph appears to be wearing the selected garment.

6. The method of claim 1, wherein the appropriateness of outfit is based on comparing the selected garment to garments in the plurality of photographs using tags of the selected garment, tags of the plurality of photographs, and predefined rules, and
wherein the appropriateness of the outfit is based on comparing tags of the selected garment to tags of the plurality of photographs, employing the pre-defined rules to determine an appropriateness of the selected garment matches clothing worn by the selected individual, and scoring the plurality of photographs based on the appropriateness of the selected garment and the pre-defined rules.

7. The method of claim 1, wherein the appropriateness of environment is based on comparing the selected garment to environments in the plurality of photographs using tags of the selected garment, tags of the plurality of photographs, and predefined rules, and
wherein the appropriateness of environment is based on comparing tags of the selected garment to tags of the plurality of photographs, employing the pre-defined rules that define matching types of garments and environments to determine an appropriateness of the selected garment in the environment, and scoring the plurality of photographs based on the appropriateness of the selected garment in the environment and the pre-defined rules.

8. The method of claim 1, wherein determining the usage patterns is based on using tags of the plurality of photographs and analytics to determine patterns of the selected individual in the plurality of photographs, wherein the patterns of the selected individual include favoring wearing a particular type of tagged garment in a particular tagged environment.

9. The method of claim 1, wherein a service provider at least one of creates, maintains, deploys and supports the computing device.

10. The method of claim 1, wherein steps of claim 1 are provided by a service provider on a subscription, advertising, and/or fee basis.

11. The method of claim 1, wherein the computing device includes software provided as a service in a cloud environment.

12. The method of claim 1, wherein:
the computing device comprises a first node in a cloud computing environment;
the repository comprises a second node in the cloud computing environment; and
the computing device is accessible by the client device accesses via network communication in the cloud computing environment.

13. A computer program product for rendering an image of a selected garment on a photograph containing a selected individual, the computer program product comprising a computer readable storage medium having program instructions embodied therewith, the program instructions executable by a computing device to cause the computing device to:
analyze and tag a plurality of photographs stored in a repository, wherein the tagging includes: tagging each of the plurality of photographs with identities of individuals in the plurality of photographs, tagging each of the plurality of photographs with identified types of garments in the plurality of photographs, and tagging each of the plurality of photographs with identified types of environment in the plurality of photographs;
receive an augment to the tagging of each of the plurality of photographs via a graphical user interface;
receive an indication of the selected garment and the selected individual,
wherein the analyzing includes determining a photograph from the plurality of photographs on which to render an image of a selected garment based on: the selected individual being in the photograph, a garment position in the photograph, appropriateness of the selected garment with other clothing worn by the selected individual in the photograph, appropriateness of the selected garment with the environment included in the photograph, and usage patterns of the selected individual;
determine the selected photograph from the plurality of photographs based on a score of the appropriateness of the selected garment to other garments in the plurality of photographs, appropriateness of the selected garment to environments in the plurality of photographs, and determined usage patterns of the selected individual in the plurality of photographs;
generate an augmented photograph by superimposing the image of the selected garment on the selected photograph; and transmit the augmented photograph over a network to a client device.

14. The computer program product of claim 13, wherein the analyzing comprises facial recognition, garment recognition, and environment recognition.

15. The computer program product of claim 13, wherein:
the determining comprises determining a cumulative score for each of the plurality of photographs based on a sum of the score of the appropriateness of outfit, appropriateness of environment, and usage patterns for each of the plurality of photographs;
the determining comprises determining a subset of the plurality of photographs that include the selected individual; and
the selected photograph is determined from the subset of the plurality of photographs.

16. The computer program product of claim 13, wherein the appropriateness of outfit is based on comparing the selected garment to garments in the plurality of photographs using tags of the selected garment, tags of the plurality of photographs, and predefined rules, and
wherein the appropriateness of the outfit is based on comparing tags of the selected garment to tags of the plurality of photographs, employing the pre-defined rules to determine an appropriateness of the selected garment matches clothing worn by the selected individual, and scoring the plurality of photographs based on the appropriateness of the selected garment and the pre-defined rules.

17. The computer program product of claim 13, wherein the appropriateness of environment is based on comparing the selected garment to environments in the plurality of photographs using tags of the selected garment, tags of the plurality of photographs, and predefined rules, and
wherein the appropriateness of the environment is based on comparing tags of the selected garment to tags of the plurality of photographs, employing the pre-defined rules that define matching types of garments and environments to determine an appropriateness of the selected garment in the environment, and scoring the plurality of photographs based on the appropriateness of the selected garment in the environment and the pre-defined rules.

18. The computer program product of claim 13, wherein the usage patterns are determined based on using tags of the plurality of photographs and analytics to determine patterns of the selected individual in the plurality of photographs, wherein the patterns of the selected individual include favoring wearing a particular type of tagged garment in a particular tagged environment.

19. A system for rendering an image of a selected garment on a photograph containing a selected individual, comprising:
a CPU, a computer readable memory and a computer readable storage medium associated with a computing device;
program instructions to analyze and tag a plurality of photographs stored in a repository using facial recognition, garment recognition, and environment recognition,
wherein the analyzing includes determining identified types of environment in each of the plurality of photographs based on a combination of an image analysis of each the plurality of photographs and geolocation metadata of each the plurality of photographs, and
wherein the tagging includes: tagging each of the plurality of photographs with identities of individuals in the plurality of photographs, tagging each of the plurality of photographs with identified types of garments in the plurality of photographs, and tagging each of the plurality of photographs with the identified types of environment in the plurality of photographs;
program instructions to receive an indication of the selected garment and the selected individual,
wherein the analyzing includes determining a photograph from the plurality of photographs on which to render an image of a selected garment based on: the selected individual being in the photograph, a garment position in the photograph, appropriateness of the selected garment with other clothing worn by the selected individual in the photograph, appropriateness of the selected garment with the environment included in the photograph, and usage patterns of the selected individual;
program instructions to determine the selected photograph from the plurality of photographs based on a score of the appropriateness of the selected garment to other garments in the plurality of photographs, appropriateness of the selected garment to environments in the plurality of photographs, and determined usage patterns of the selected individual in the plurality of photographs;
program instructions to generate an augmented photograph by superimposing the image of the selected garment on the selected photograph; and
program instructions to transmit the augmented photograph over a network to a client device,
wherein the program instructions are stored on the computer readable storage medium for execution by the CPU via the computer readable memory.

20. The system of claim 19, wherein:
the determining comprises determining a cumulative score for each of the plurality of photographs based on a sum of the score of the appropriateness of outfit, appropriateness of environment, and usage patterns for each of the plurality of photographs;
the determining comprises determining a subset of the plurality of photographs that include the selected individual; and
the selected photograph is determined from the subset of the plurality of photographs.

* * * * *